United States Patent
Wohlfeld et al.

(10) Patent No.: US 11,861,863 B2
(45) Date of Patent: Jan. 2, 2024

(54) SHAPE DEPENDENT MODEL IDENTIFICATION IN POINT CLOUDS

(71) Applicant: FARO Technologies, Inc., Lake Mary, FL (US)

(72) Inventors: Denis Wohlfeld, Ludwigsburg (DE); Florian Schellroth, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 417 days.

(21) Appl. No.: 16/899,530

(22) Filed: Jun. 11, 2020

(65) Prior Publication Data
US 2020/0394815 A1 Dec. 17, 2020

Related U.S. Application Data

(60) Provisional application No. 62/862,315, filed on Jun. 17, 2019.

(51) Int. Cl.
*G06T 7/70* (2017.01)
*G01S 7/48* (2006.01)
*G01S 17/42* (2006.01)

(52) U.S. Cl.
CPC .............. *G06T 7/70* (2017.01); *G01S 7/4802* (2013.01); *G01S 17/42* (2013.01); *G06T 2207/10028* (2013.01)

(58) Field of Classification Search
CPC ............. G06T 7/70; G06T 2207/10028; G01S 7/4802; G01S 7/42
See application file for complete search history.

(56) References Cited

U.S. PATENT DOCUMENTS

| | | | |
|---|---|---|---|
| 9,074,878 B2 | 7/2015 | Steffey et al. | |
| 9,934,590 B1* | 4/2018 | Cheng | G06T 7/11 |
| 2007/0081695 A1* | 4/2007 | Foxlin | G06T 7/73 382/103 |
| 2010/0259537 A1* | 10/2010 | Ben-Himane | G06T 7/75 345/419 |
| 2014/0149376 A1* | 5/2014 | Kutaragi | G06F 16/5854 707/706 |
| 2014/0232748 A1* | 8/2014 | Kis | G06T 7/248 345/633 |
| 2016/0372156 A1* | 12/2016 | Pound | G11B 27/105 |
| 2017/0336508 A1 | 11/2017 | Zweigle et al. | |
| 2018/0071914 A1* | 3/2018 | Heidemann | F16P 3/142 |
| 2018/0150974 A1* | 5/2018 | Abe | G06K 9/6256 |
| 2019/0035080 A1* | 1/2019 | Bisker | G06T 7/74 |
| 2019/0154806 A1 | 5/2019 | Zweigle et al. | |

(Continued)

*Primary Examiner* — Ariel A Balaoing
(74) *Attorney, Agent, or Firm* — McCarter & English, LLP; Dave S. Christensen; David K. Kincaid

(57) ABSTRACT

A system for shape dependent model identification in a point cloud includes a scanner device that captures a 3D point cloud that contains a representation of an object. The system further includes a computer that receives a sensor data, a capture time of the sensor data being substantially the same time as that of the 3D point cloud, the sensor data indicative of a position of a movable part of the object at the time of capture. The computer further computes an adjusted shape of the object from a baseline shape of the object by using the sensor data. The system further includes an object recognition module that searches for and identifies the adjusted shape of the object in the 3D point cloud.

20 Claims, 10 Drawing Sheets

(56) References Cited

U.S. PATENT DOCUMENTS

| | | |
|---|---|---|
| 2019/0257642 A1 | 8/2019 | Hillebrand |
| 2019/0272411 A1* | 9/2019 | Zou .......................... G06T 7/10 |
| 2019/0339391 A1 | 11/2019 | Santos et al. |
| 2020/0018869 A1 | 1/2020 | Ossig et al. |
| 2020/0033500 A1 | 1/2020 | Trollmann et al. |
| 2020/0109937 A1 | 4/2020 | Zweigle et al. |
| 2020/0109943 A1 | 4/2020 | Buback et al. |
| 2020/0134839 A1* | 4/2020 | Sevostianov ........... G06F 3/014 |
| 2020/0191555 A1 | 6/2020 | Zweigle et al. |
| 2021/0383115 A1* | 12/2021 | Alon ................... G06K 9/6201 |

* cited by examiner

SHAPE DEPENDENT MODEL IDENTIFICATION IN POINT CLOUDS

CROSS REFERENCE TO RELATED APPLICATIONS

This application claims the benefit of U.S. Provisional Application Ser. No. 62/862,315, filed Jun. 17, 2019, the entire disclosure of which is incorporated herein by reference.

BACKGROUND

The present application is generally related to computer vision, and is directed to technical solutions for optically scanning an environment, such as a building, for generating point clouds of the scanned environment, and further for identifying objects in the point clouds.

Advances in sensor technology have enabled capturing colorized point cloud data to be routinely collected for large scenes/environments such as laboratories, industrial assembly lines, a workshop, office spaces, manufacturing environments, warehouses, and various other commercial and non-commercial environments. For example, the point cloud data is collected by Light Detection and Ranging (LIDAR), time-of-flight imagers, laser scanners, stereo imagers, or other related sensors. Such point clouds can contain millions of data points that store the spatial coordinates of the each data point along with information, such as color information, for example in red-green-blue (RGB) or other such format. A point cloud can capture a corresponding scene or object in the environment in three-dimensions (3D), by capturing millions of data points pn each having three dimensional x, y, and z spatial coordinates $p_n=(x,y,z)$.

BRIEF DESCRIPTION

According to one or more embodiments, a system for shape dependent model identification in a point cloud includes a scanner device that captures a 3D point cloud that contains a representation of an object. The system further includes a computer that receives a sensor data, a capture time of the sensor data being substantially the same time as that of the 3D point cloud, the sensor data indicative of a position of a movable part of the object at the time of capture. The computer further computes an adjusted shape of the object from a baseline shape of the object by using the sensor data. The system further includes an object recognition module that searches for and identifies the adjusted shape of the object in the 3D point cloud.

According to one or more embodiments, a method for shape dependent model identification in point clouds includes capturing, by a scanner device, a 3D point cloud that contains a representation of an object. The method further includes receiving, by a computer, a sensor data, a capture time of the sensor data being substantially the same time as that of the 3D point cloud, the sensor data indicative of a position of a movable part of the object at the time of capture. The method further includes computing, by the computer, an adjusted shape of the object from a baseline shape of the object by using the sensor data. The method further includes searching for and identifying, by an object recognition module, the adjusted shape of the object in the 3D point cloud.

According to one or more embodiments, a computer program product includes a memory device having computer executable instructions stored thereon. The computer executable instructions when executed by one or more processors perform a method for shape dependent model identification in point clouds. The method includes capturing, by a scanner device, a 3D point cloud that contains a representation of an object. The method further includes receiving, by a computer, a sensor data, a capture time of the sensor data being substantially the same time as that of the 3D point cloud, the sensor data indicative of a position of a movable part of the object at the time of capture. The method further includes computing, by the computer, an adjusted shape of the object from a baseline shape of the object by using the sensor data. The method further includes searching for and identifying, by an object recognition module, the adjusted shape of the object in the 3D point cloud.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

One or more embodiments of the present invention relate to capturing the point clouds and further a technical problem to recognize meaningful objects from the millions of points in each of these point clouds. Particularly, the technical problem addressed by one or more embodiments of the present invention is to autonomously identify a movable object in a point cloud based on a computer aided design (CAD) model of the movable object taking into consideration that a captured shape of the object can vary based on one or more "joints" of the object. A "joint" can be a connecting point, or a movable junction of the object that facilitate one or more parts of the object to turn/change direction along one or more axes.

Figure 1:
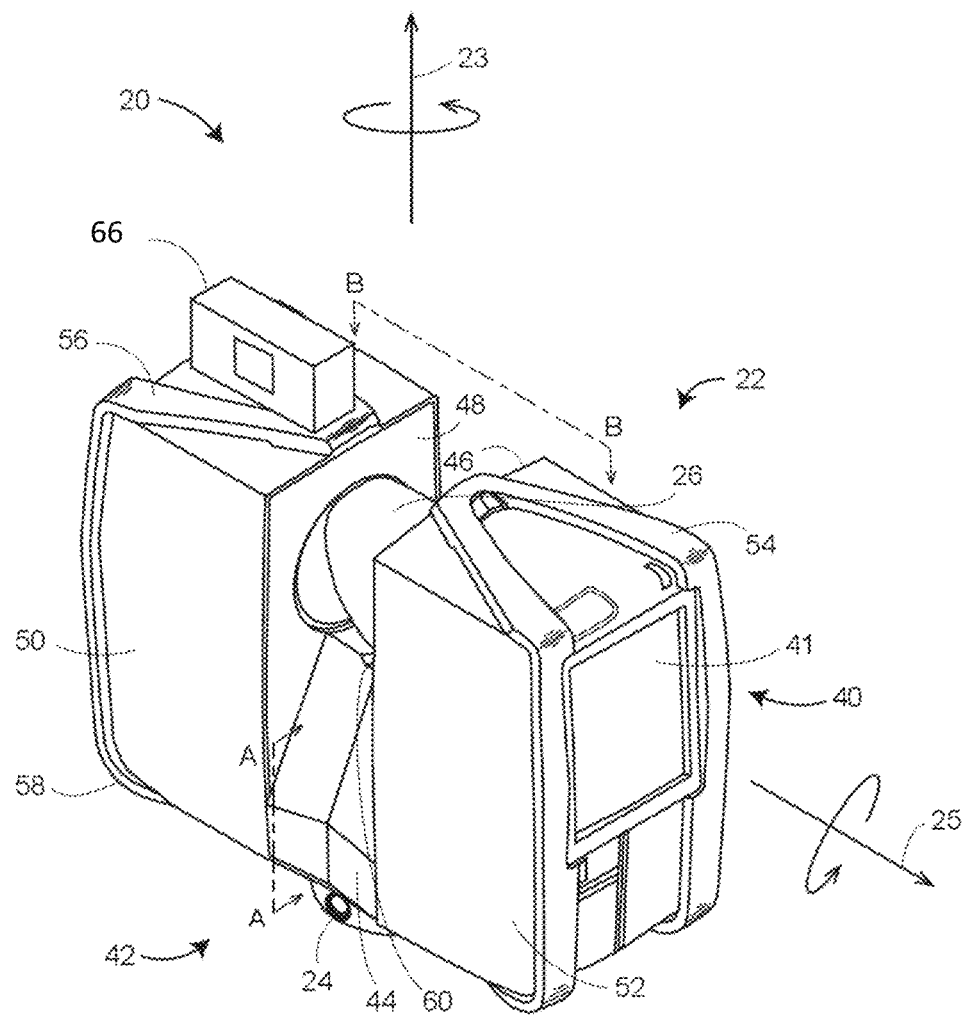
FIG. 1 is a perspective view of a laser scanner in accordance with an embodiment of the invention.
Figure 2:
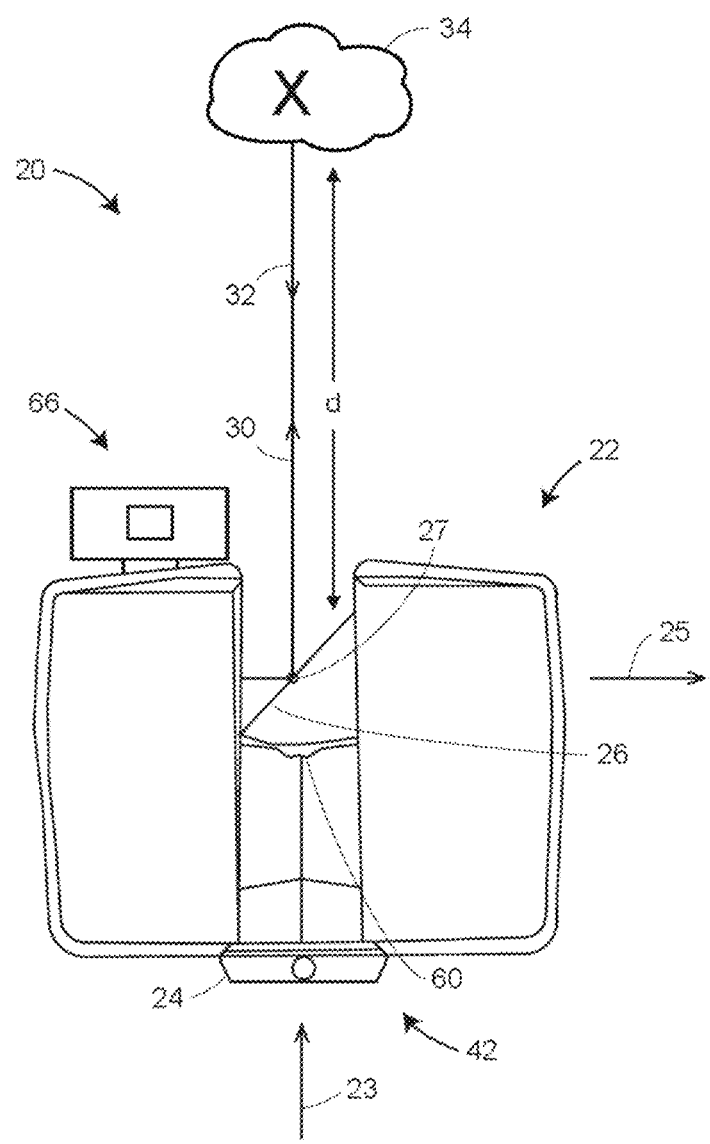
FIG. 2 is a side view of the laser scanner illustrating a method of measurement according to an embodiment.
Figure 3:
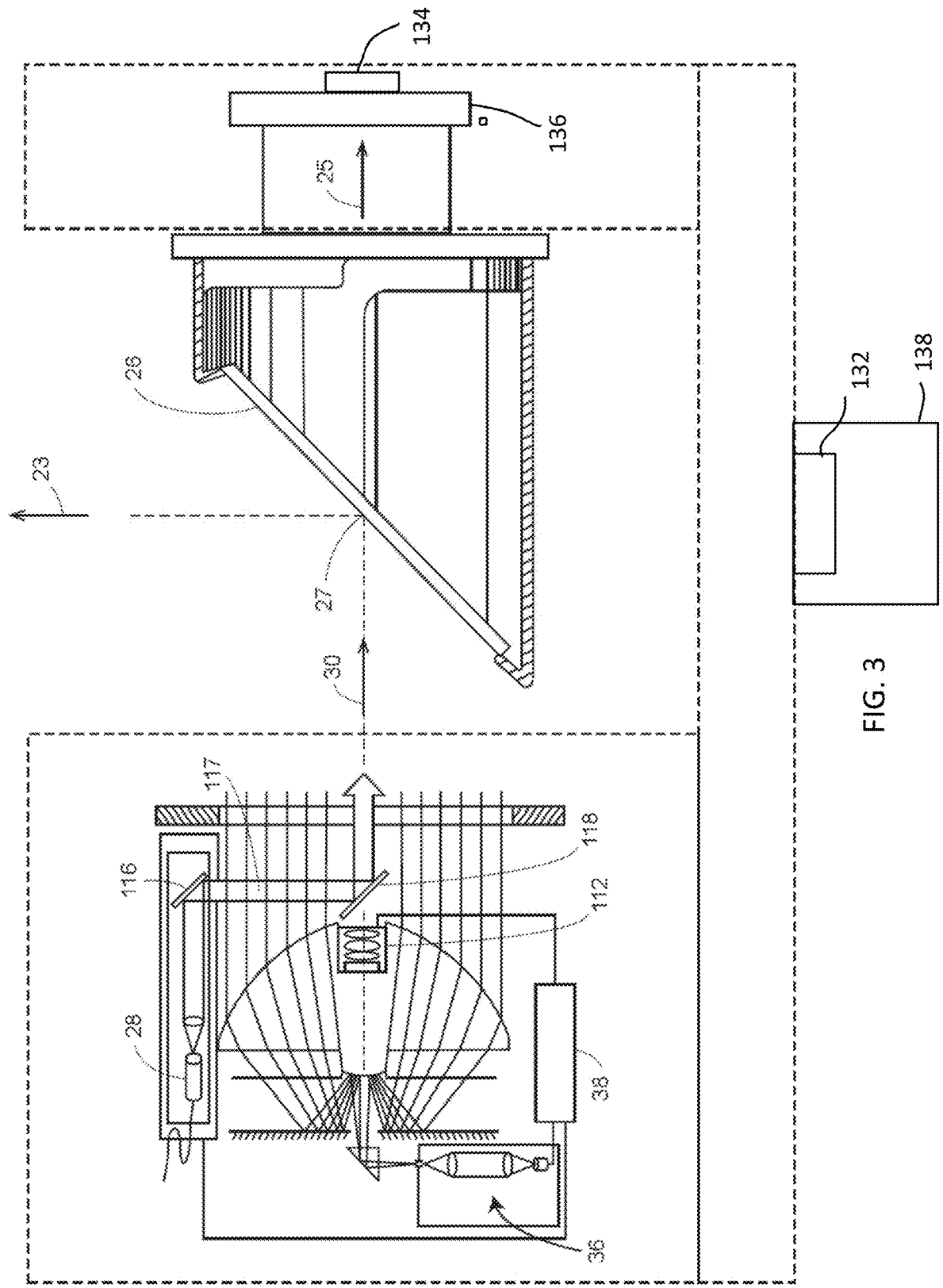
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse member 44 adjacent the base 24. The arm portion 58 for each yoke 54, 56 extends from the traverse member 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse member 44, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse member 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse member 44. When the mirror 26 rotates, during each rotation the mirror 26 directs the emitted light beam 30 onto the traverse member 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera, which can be the first image acquisition device 112, obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
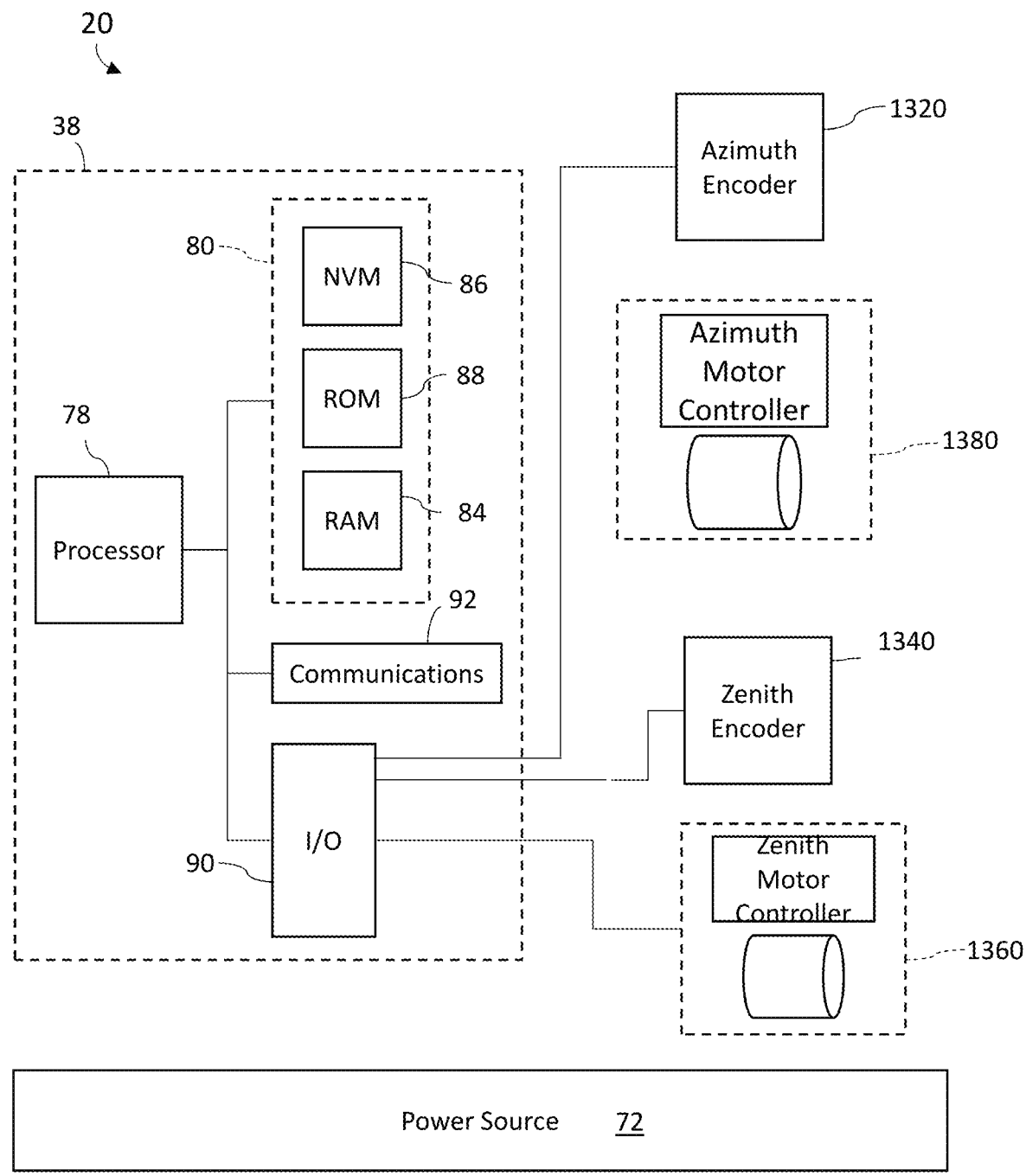
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements, such as the processors 78. The processors may be microprocessors, field programmable gate arrays (FPGAs), digital signal processors (DSPs), and generally any device capable of performing computing functions. The one or more processors 78 have access to memory 80 for storing information Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source/emitter 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface via the display device 40 coupled to controller 38. The user interface may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 72 are coupled to memory 80. The memory 80 may include random access memory (RAM) device 84, a non-volatile memory (NVM) device 86, and a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
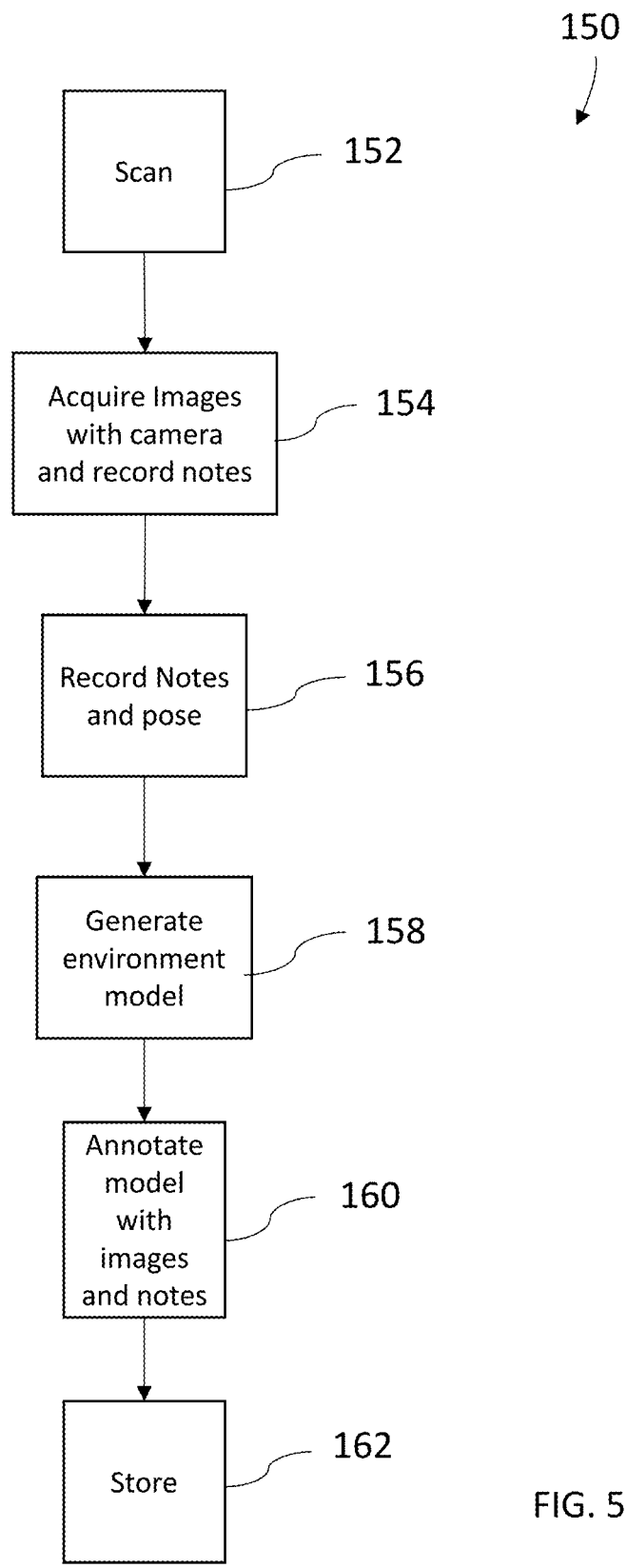
FIG. 5 is a flow diagram of a method of generating a map with annotations in accordance with an embodiment.

Referring now to FIG. 5, a method 150 is shown for generating a model or layout of the environment. A model/layout of the environment can be a 2D map, a 3D point cloud, or a combination thereof of the environment. The model can be generated using a scanner 20. A 2D scan is captured by capturing point clouds in a single plane by the 3D scanner 20. Unless specified, as used henceforth, a "model" or an "environment model" can be a 2D map or a 3D point cloud or a combination thereof scanned using a corresponding 2D/3D scanner system. In one or more examples, the scanning is performed on a periodic basis (daily, weekly, monthly) so that an accurate model of the environment can be made available. This periodic scanning makes the object recognition desirable to save time, so that the shape-changing objects do not have to be reset to an initial (or any other predetermined) state. For example, a scan may be performed in a manufacturing facility, while the facility is operating, therefore any movable objects (e.g. robots) may be automatically recognized no matter what position that are in at the instant the scan is performed.

In this embodiment, the method 150 starts in block 152 with the operator initiating the scanning of an area or facility with the scanner 20 as described herein. The method 150 then proceeds to block 154 wherein the operator acquires images with a camera during the scanning process. The images may be acquired by a camera located in a mobile computing device (e.g. personal digital assistant, cellular phone, tablet or laptop) carried by the operator for example.

In one or more embodiments, the scanner 20 may include a holder (not shown) that couples the mobile computing device to the scanner 20. In block 154, the operator may further record notes. These notes may be audio notes or sounds recorded by a microphone in the mobile computing device. These notes may further be textual notes input using a keyboard on the mobile computing device. It should be appreciated that the acquiring of images and recording of notes may be performed simultaneously, such as when the operator acquires a video. In one or more embodiments, the recording of the images or notes may be performed using a software application executed on a processor of the mobile computing device. The software application may be configured to communicate with the scanner 20, such as by a wired or wireless (e.g. BLUETOOTH™) connection for example, to transmit the acquired images or recorded notes to the scanner 20. In one embodiment, the operator may initiate the image acquisition by actuating actuator 38 that causes the software application to transition to an image acquisition mode.

Figure 6:
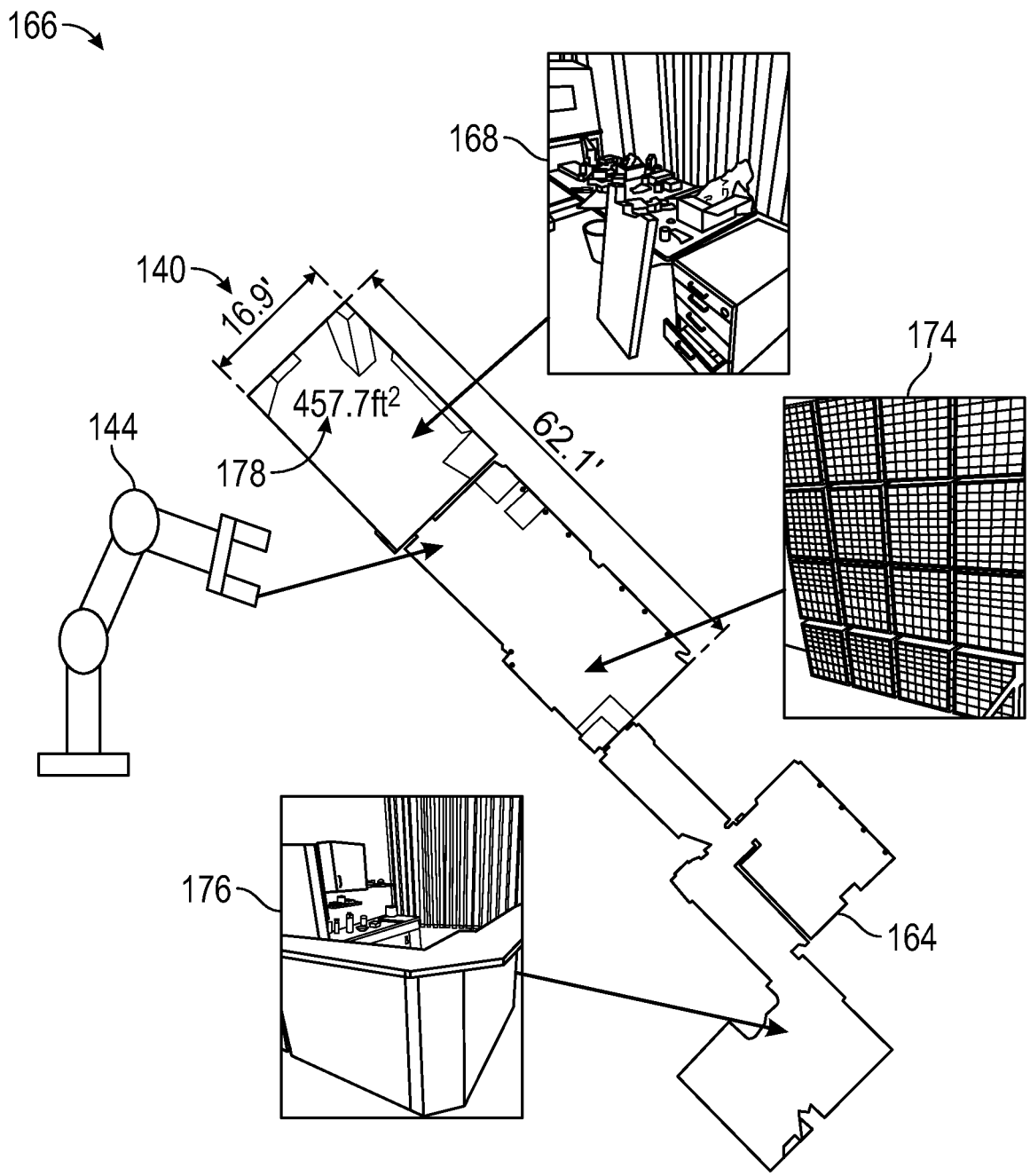
FIG. 6 is an annotated map generated with the method of FIG. 5 in accordance with an embodiment.

The method 150 then proceeds to block 156 where the images and notes are stored in memory, such as memory 80 for example. In one or more embodiments, the data on the pose of the scanner 20 is stored with the images and notes. In still another embodiment, the time or the location of the scanner 20 when the images are acquired or notes were recorded is also stored. Once the scanning of the area or facility is completed, the method 150 then proceeds to block 158 where the environment model 164 (FIG. 6) is generated as described herein. The method 150 then proceeds to block 160 where an annotated environment model 166 (FIG. 6) is generated. The annotated environment model 166 may include user-defined annotations, such as dimensions 140 or room size 178 described herein above with respect to FIG. 10. The annotations may further include user-defined free-form text or hyperlinks for example. Further, in the exemplary embodiment, the acquired images 168 and recorded notes are integrated into the annotated environment model 166. In one or more embodiments, the image annotations are positioned to the side of the environment model 164 the image was acquired or the note recorded. It should be appreciated that the images allow the operator to provide information to the map user on the location of objects, obstructions and structures, such as but not limited to robot 144, barrier 174 and counter/desk 176 for example. Finally, the method 150 proceeds to block 162 where the annotated map is stored in memory.

It should be appreciated that the image or note annotations may be advantageous in embodiments where the annotated environment model 166 is generated for public safety personnel, such as a fire fighter for example. The images allow the fire fighter to anticipate obstructions that may not be seen in the limited visibility conditions such as during a fire in the facility. The image or note annotations may further be advantageous in police or criminal investigations for documenting a crime scene and allow the investigator to make contemporaneous notes on what they find while performing the scan.

Figure 7:
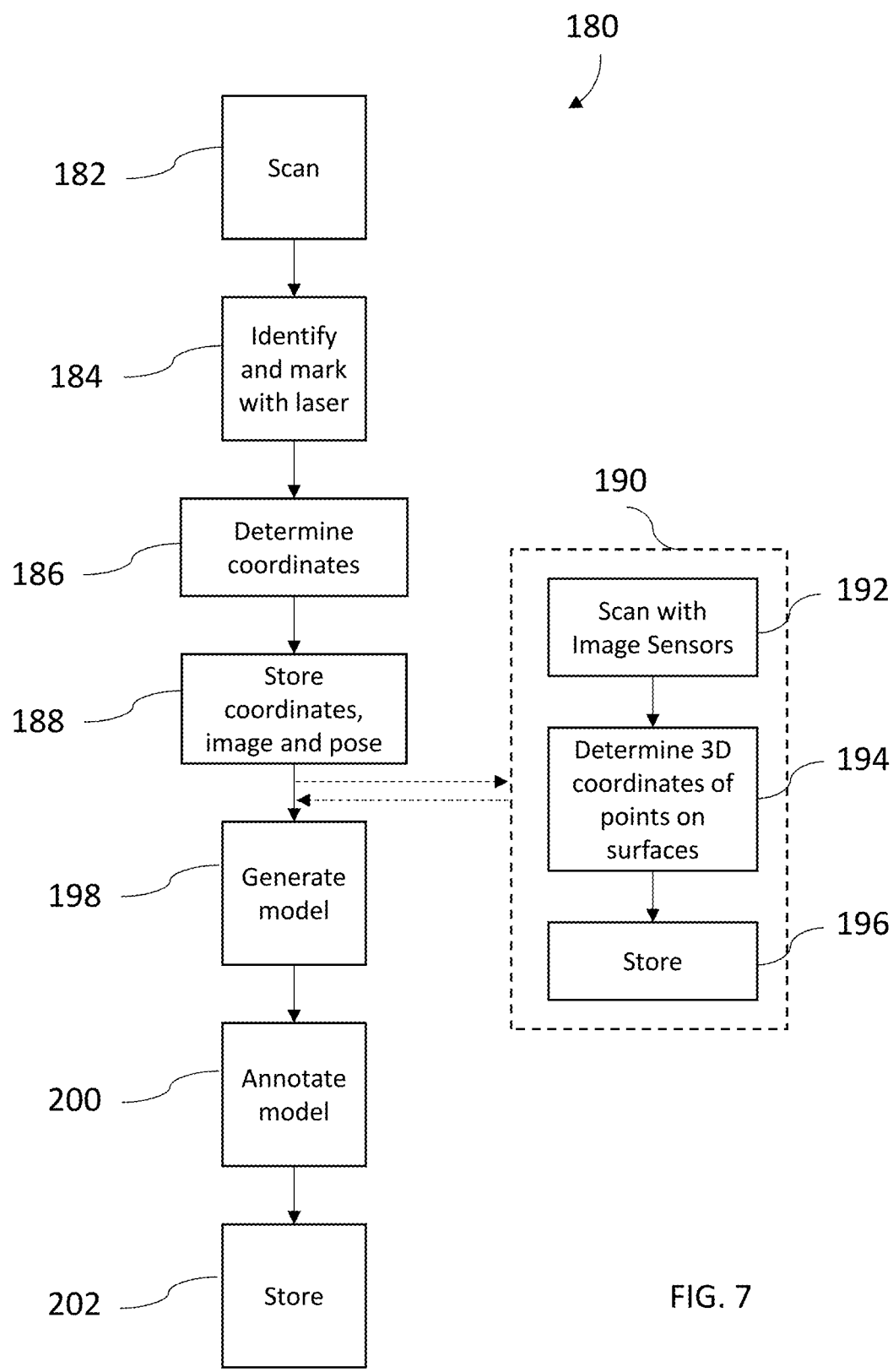
FIG. 7 is a flow diagram of a method of generating a map and a three-dimensional point cloud in accordance with an embodiment.

Referring now to FIG. 7, another method 180 is shown of generating a environment model having annotation that include 3D coordinates of objects within the scanned area. The method 180 begins in block 182 with the operator scanning the area. During the scanning process, the operator may see an object, such as robot 144 (FIG. 6) or any other equipment for example, that the operator may desire to locate more precisely within the environment model or acquire additional information. In one or more embodiments, the scanner 20 includes a laser projector (not shown) that the operator may activate. The laser projector emits a visible beam of light that allows the operator to see the direction the scanner 20 is pointing. Once the operator locates the light beam from laser projector on the desired object, the method 180 proceeds to block 186 where the coordinates of the spot on the object of interest are determined. In one embodiment, the coordinates of the object are determined by first determining a distance from scanner 20 to the object. In one or more embodiments, this distance may be determined by a 3D measurement device, such as but not limited to a laser scanner 20, or a 3D camera (not shown) (e.g. an RGBD camera) for example. In addition to the distance, the 3D camera 60 also may acquire an image of the object. Based on knowing the distance along with the pose of the scanner 20, the coordinates of the object may be determined. The method 180 then proceeds to block 188 where the information (e.g. coordinates and image) of the object are stored in memory.

It should be appreciated that in some embodiments, the operator may desire to obtain a three-dimensional (3D) representation of the object of interest in addition to the location relative to the environment model. In this embodiment, the method 180 proceeds to scanning block 190 and acquires 3D coordinates of points on the object of interest. In one or more embodiments, the object is scanned with a 3D coordinate measurement device, such as a laser scanner 20, or the 3D camera 60 in block 192. The scanner 20 then proceeds to determine the 3D coordinates of points on the surface of the object or interest in block 194. In one or more embodiments, the 3D coordinates may be determined by determining the pose of the scanner when the image is acquired by the 3D camera. The pose information along with the distances and a registration of the images acquired by the 3D camera may allow the generation of a 3D point cloud of the object of interest. In one embodiment, the orientation of the object of interest relative to the environment is also determined from the acquired images. This orientation information may also be stored and later used to accurately represent the object of interest on the environment model. The method 180 then proceeds to block 196 where the 3D coordinate data is stored in memory.

The method 180 then proceeds to block 198 where the environment model 166 is generated as described herein. In one or more embodiments, the location of the objects of interest (determined in blocks 184-186) are displayed on the environment model 166 as a symbol 147, such as a small circle, icon, or any other such indicator. It should be appreciated that the environment model 166 may include additional user-defined annotations added in block 200, such as those described herein with reference to FIG. 6. The environment model 166 and the annotations are then stored in block 202.

In use, the map user may select one of the symbols, such as symbol 147 for example. In response, an image of the object of interest 191, 193 may be displayed. Where the object or interest 191, 193 was scanned to obtain 3D coordinates of the object, the 3D representation of the object of interest 191, 193 may be displayed.

A technical challenge exists in cases such as in modern digital factories, where objects are mobile. In such cases, precise tracking of the objects is a technical challenge so as to capture the point cloud representation of the object such that the object is recognizable from the captured point cloud. Those objects, for example robot 144, may not only be mobile, but also be capable to reshape by actuating one or more components or parts (e.g. an arm) about one or more axes. It should be noted that the embodiments herein are described using robot 144 as such shape-changing objects, however, in other embodiments the shape-changing objects can be other types of objects.

Figure 8:
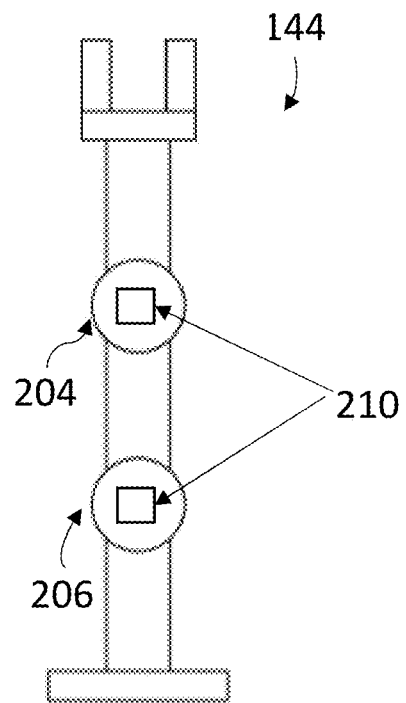
FIGS. 8-9 are views of a shape changing object in accordance with one or more embodiments.
Figure 9:
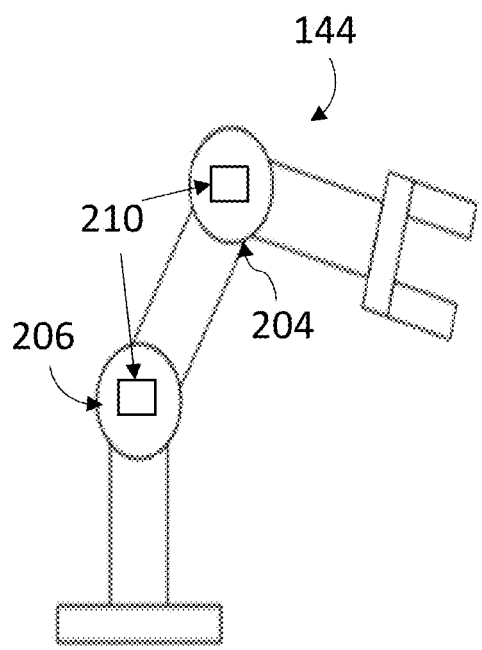

FIG. 8 and FIG. 9 illustrate shape-change of a robot 144 according to one or more embodiments. Typically, CAD-models of robots 144 and other manufacturing units represent a baseline, or an "All-Zero" state (FIG. 8) of the unit's axes (204, 206). It should be noted that the robot 144 depicted herein is shown with two axes 204, 206 along which the robot 144 can change its shape, however, in other examples, the robot 144 can include any other number of axes, and the axes can facilitate a change in shape in a different manner than what is depicted. The "in-use" shape (FIG. 9) of the robot 144 differs from the CAD model (FIG. 8).

This is challenging when considering an artificial intelligence (AI) or other autonomous process to perform recognition or identification of the robot in the point cloud, because AI would need training data for all possible shapes of the robot 144, increasing training time, training data generation and overhead. The technical solutions described herein address such challenges by using a shaped CAD model, representing the actual axes data of the robot 144, and then using the AI to allocate the shaped model's representation in the point cloud that is captured.

The technical solutions described herein facilitate autonomously identifying CAD models in the point cloud, the CAD models being such that the real-world object's shape changes over time (FIGS. 8, and 9).

To facilitate this, the robot 144 is a smart device, that includes one or more sensors 210 (FIG. 8, 9). The robot 144 provides access to the sensor data, such as position, speed, timestamp, and the like. The sensors 210 can include position sensors, gyroscope, timer, and other such sensors that can provide an identification of the movement of the one or more axes 204, 206, and hence to the real-world shape of the robot 144 at time of measurement. In such cases, the sensor data is used with a timestamp equal or close to the scanning timestamp (from the scanner 20) to shape the CAD model in order to gain similarity between the CAD model and the real-world representation of the robot 144. This shaped CAD model can then be used to search for the respective object in the point cloud that is captured.

It should be noted that the sensors 210 depicted in FIG. 8 and FIG. 9 are exemplary, and that in other examples, the sensors 210 can be located at different points on the robot 144. Further, other types of sensors may also be used other than a rotational sensor. For example, where the object has a portion that moves linearly, a linear encoder may be used to determine its position.

Figure 10:
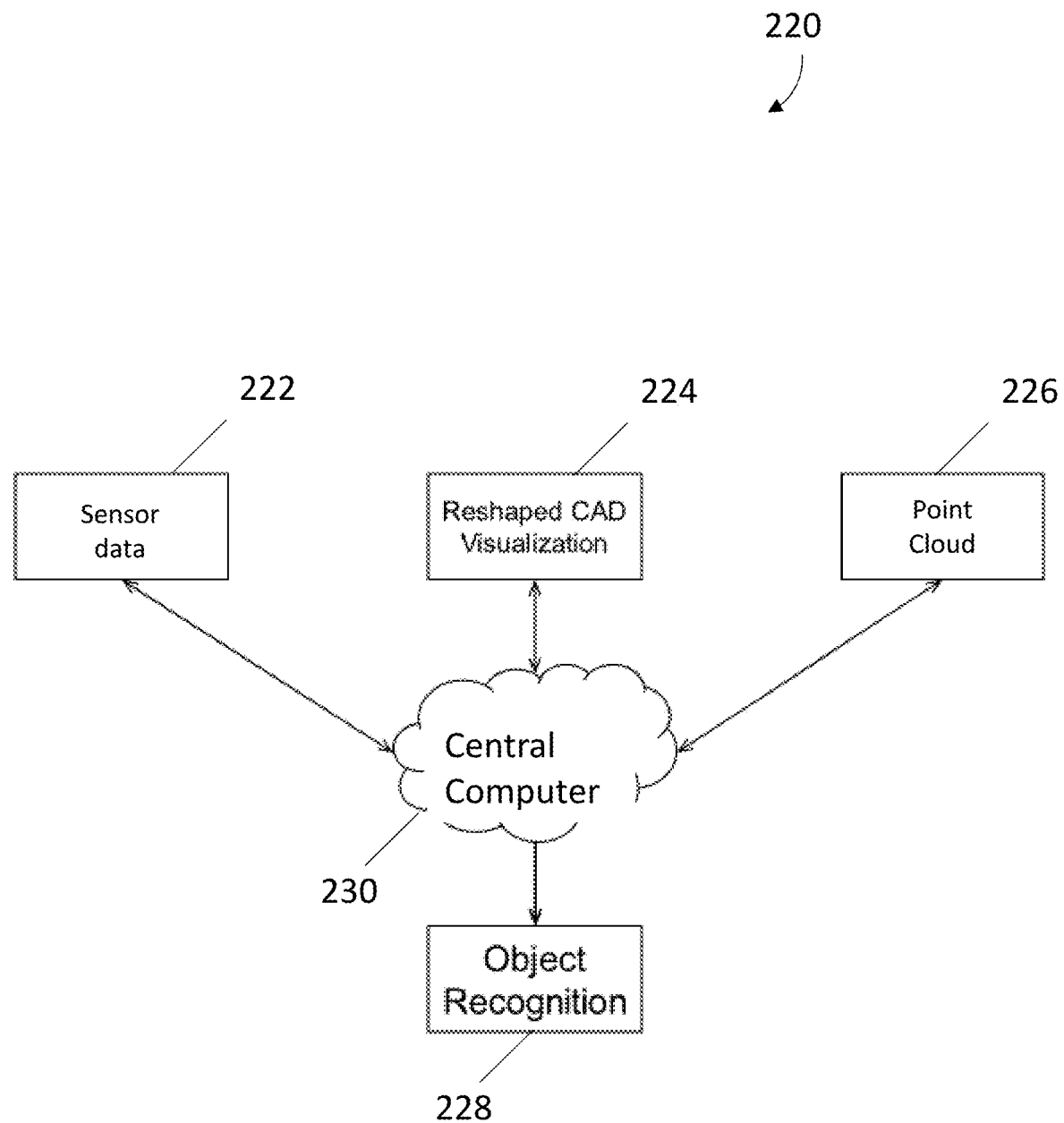
FIG. 10 is a system that can identify a shape changing object in a 3D point cloud in accordance with one or more embodiments.
Figure 11:
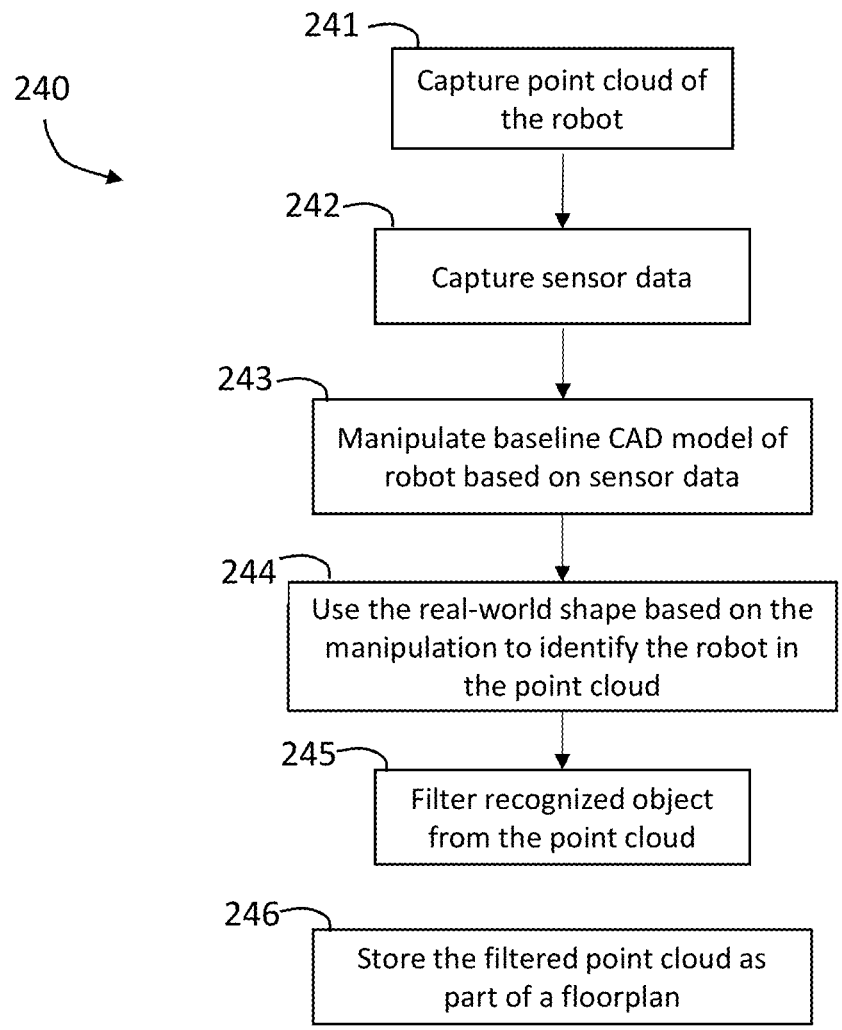
FIG. 11 is a flow diagram of a method to identify a shape changing object in a 3D point cloud in accordance with one or more embodiments.

FIG. 10 depicts an object recognition system that can identify a shape-changing object in a point cloud according to one or more embodiments. FIG. 11 depicts a flowchart of a method for object recognition for a shape changing object in a point cloud according to one or more embodiments. The method 240 includes capturing a point cloud 226 containing the robot 144 using the scanner 20, at 241. At the same time, the method also includes collecting sensor data 222 for the axes (204, 206) from the robot 144, at 242. In one or more examples, the sensor data 222 from the robot 144 can be received using a messaging framework like OPC uniform architecture, near field communication, or any other communication protocol/framework (e.g. Data Distribution Service or DDS). Those messaging frameworks provide messaging streams or similar technologies, where the sensor and axes data can be consumed.

In one or more examples, the timestamps of the captured point cloud 226 and the captured sensor data 222 are stored. Accordingly, for an offline analysis at a later time the timestamps can be compared and the point cloud 226 and the sensor data 222 with substantially matching timestamps are used together to recognize the robot 144 in the point cloud 226.

Both inputs, the point cloud 226 from the laser scanning and the sensor data 222, can be collected by a central computing device 230, such as a networked computer, an enterprise computer/server, and the like. The central computer accesses a baseline CAD model of the robot 144 and manipulates the baseline CAD model to represent a real-world shape 224 of the robot 144, at 243. In one or more examples, the manipulation is performed using a CAD program. It should be appreciated that while the examples provided herein refer to the central computing device 230 as a single device, this is for example purposes and in other embodiments the central computing device may be comprised of a plurality of computing devices or be part of a distributed computing system.

An object recognition module 228 uses the obtained real-world shape 224 to identify the robot 144 in the point cloud 226, at 244. In one or more examples, the object recognition module 228 uses an AI, which searches the point cloud 226 for the real-world shape 224.

Accordingly, objects without a fixed shape can be recognized or even identified in the point cloud 226. The technical solutions in this manner provide a robust and efficient recognition algorithm, compared to "brute force" combinatorial algorithm. Further, objects of the same class can be distinguished based on the sensor data. Typically, multiple instances of one object, for example, multiple robots of the same type, are present in one point cloud. The object surface information is equal for each instance but the pose can be extracted from the general control system. Because robots typically have different poses, which can be read from the control system, one robot can be distinguished from another robot of the same type. Objects that are recognized in the point cloud 226, in this manner, can be filtered, if desired, at 245. The method 240 can be repeated for each point cloud capture. The filtered point cloud is then stored as part of the 2D floorplan, at 246.

Accordingly, the technical solutions described herein facilitate autonomously identifying an object that can change shape in a point cloud based on a baseline CAD model of the object. To facilitate such object recognition, at the time the point cloud is captured by a scanner, data from one or more sensors associated with the object are also captured. The sensor data is stored with the point cloud along with a timestamp that is indicative that the two input data were captured substantially simultaneously. The sensor data identify a position of one or more axes (or configurations) of the object. The position of the axes is used to determine a shifted/changed CAD model from the baseline CAD model. The shifted/changed shape represented by the new CAD model is subsequently searched for and identified in the point cloud. According to one or more embodiments, the CAD model can be a parametric based model, which includes constraints for the robot 144 represented by the CAD model to move to a position within a range of motion defined by the constraints. Alternatively, or in addition, the CAD model includes a catalog of files/data structures with the robot 144 defined in different positions of that robot 144 in operation.

It should be appreciated that this provides advantages when environments are scanned on a periodic basis in that the system can distinguish between an object that was newly placed in the environment from one that is simply in a different position (e.g. arms are in a different configuration). This allows the operator to maintain an updated catalog or schedule of objects within the environment.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for shape dependent model identification in a point cloud, the system comprising:
    a scanner device that captures a 3D point cloud corresponding to a representation of an object with a scanning timestamp;
    a computer that receives a sensor data, a time of capture of the sensor data comprising a timestamp being substantially the same time as that of the scanning timestamp of the 3D point cloud, the sensor data indicative of a position of a movable part of the object at the time of capture, the sensor data received from a sensor coupled to the object;
    the computer further configured to compute an adjusted shape of the object from a baseline shape of the object by using the sensor data having the timestamp with substantially the same time as that of the scanning timestamp of the 3D point cloud; and
    an object recognition module that searches for and identifies the object in the 3D point cloud having the scanning timestamp with substantially the same time as that of the sensor data based on the adjusted shape.

2. The system of claim 1, wherein the baseline shape of the object represents a shape of the object with one or more movable parts of the object being in an initial state.

3. The system of claim 1, wherein the sensor data comprises a plurality of positions of a plurality of moving parts of the object respectively.

4. The system of claim 1, wherein the baseline shape of the object is a computer aided design model of the object.

5. The system of claim 1, wherein the adjusted shape of the object is computed by using a computer aided design program.

6. The system of claim 1, wherein the computer is further configured to filter the object from the 3D point cloud based on the adjusted shape.

7. The system of claim 6, wherein the computer is further configured to store the filtered 3D point cloud as part of an environment model captured by the scanner device.

8. The system of claim 1, wherein the sensor captures the sensor data provides information about movement of the movable part of the object along one or more axes.

9. The system of claim 1, wherein the sensor comprises a plurality of sensors, at least one sensor from the sensors being associated with a joint of the object.

10. A method for shape dependent model identification in point clouds, the method comprising:
- capturing, by a scanner device, a 3D point cloud corresponding to a representation of an object with a scanning timestamp;
- receiving, by a computer, a sensor data, a time of capture of the sensor data comprising a timestamp being substantially the same time as that of the scanning timestamp of the 3D point cloud, the sensor data indicative of a position of a movable part of the object at the time of capture, the sensor data received from a sensor coupled to the object;
- computing, by the computer, an adjusted shape of the object from a baseline shape of the object by using the sensor data having the timestamp with substantially the same time as that of the scanning timestamp of the 3D point cloud; and
- searching for and identifying, by an object recognition module, the object in the 3D point cloud having the scanning timestamp with substantially the same time as that of the sensor data based on the adjusted shape.

11. The method of claim 10, wherein the baseline shape of the object represents a shape of the object with one or more movable parts of the object being in an initial state.

12. The method of claim 10, wherein the sensor data comprises a plurality of positions of a plurality of moving parts of the object respectively.

13. The method of claim 10, wherein the baseline shape of the object is a computer aided design model of the object.

14. The method of claim 10, wherein the adjusted shape of the object is computed by using a computer aided design program.

15. The method of claim 10, wherein the computer is further configured to filter the object from the 3D point cloud based on the adjusted shape, and to store the filtered 3D point cloud as part of an environment model captured by the scanner device.

16. A computer program product comprising a non-transitory memory device having computer executable instructions stored thereon, the computer executable instructions when executed by one or more processors perform a method for shape dependent model identification in point clouds, the method comprising:
- capturing, by a scanner device, a 3D point cloud corresponding to a representation of an object with a scanning timestamp;
- receiving, by a computer, a sensor data, a time of capture of the sensor data comprising a timestamp being substantially the same time as that of the scanning timestamp of the 3D point cloud, the sensor data indicative of a position of a movable part of the object at the time of capture, the sensor data received from a sensor coupled to the object;
- computing, by the computer, an adjusted shape of the object from a baseline shape of the object by using the sensor data having the timestamp with substantially the same time as that of the scanning timestamp of the 3D point cloud; and
- searching for and identifying, by an object recognition module, the object in the 3D point cloud having the scanning timestamp with substantially the same time as that of the sensor data based on the adjusted shape.

17. The computer program product of claim 16, wherein the baseline shape of the object represents a shape of the object with one or more movable parts of the object being in an initial state.

18. The computer program product of claim 16, wherein the sensor data comprises a plurality of positions of a plurality of moving parts of the object respectively.

19. The computer program product of claim 16, wherein the baseline shape of the object is a computer aided design model of the object.

20. The computer program product of claim 16, wherein the adjusted shape of the object is computed by using a computer aided design program.

\* \* \* \* \*